United States Patent [19]

Schlarlack

[11] 4,320,288
[45] Mar. 16, 1982

[54] SOLAR TRACKING SYSTEM

[75] Inventor: Ronald S. Schlarlack, Brookline, Mass.

[73] Assignee: Thermo Electron Corporation, Waltham, Mass.

[21] Appl. No.: 143,403

[22] Filed: Apr. 25, 1980

[51] Int. Cl.³ .............................................. G01J 1/20
[52] U.S. Cl. ................................ 250/203 R; 126/425
[58] Field of Search ............... 250/203 R, 209, 237 R; 126/424, 425

[56] References Cited

U.S. PATENT DOCUMENTS

| | | | |
|---|---|---|---|
| 3,229,102 | 1/1966 | Spencer et al. | 250/203 R |
| 3,421,004 | 1/1969 | Cashion | 250/203 R |
| 3,515,594 | 6/1970 | Samuels | 250/203 R |
| 4,031,385 | 6/1977 | Zerlaut et al. | 250/203 R |
| 4,205,659 | 6/1980 | Beam | 126/425 |

Primary Examiner—David C. Nelms
Attorney, Agent, or Firm—Herbert E. Messenger; James L. Neal

[57] ABSTRACT

A dual mode solar tracking method and system in which a sensor of radiation from the sun normally tracks the sun at a rate determined by a priori information, departure from normal tracking and correction for tracking rate errors being introduced only when the errors exceed a predetermined value and the strength of radiation from the sun exceeds a predetermined threshold value.

10 Claims, 5 Drawing Figures

SENSING ELEMENTS MOUNTED ON SLOPED SURFACES UNDER SHADOW BAR

SOLAR TRACKING SYSTEM

BACKGROUND OF THE INVENTION

This invention relates in general to solar tracking and, more particularly, to dual mode solar tracking.

To implement the proper operation of photovoltaic, solar-thermal, and various instrumentation systems, accurate and continuous tracking of the sun is necessary. Numerous systems have been devised and some have achieved considerable success. Typically, these systems employ paired photocells which are mounted on flat surfaces at equal and opposite angles of inclination to a base. The cells are also equiangularly disposed about a reference axis which extends perpendicularly from the base. The reference axis constitutes the aiming direction of the tracking system.

The underlying theory of operation is that the illumination of each mounting surface is proportional to the cosine of the angle of incidence of radiation. Thus, when the system is trained on the sun, incident solar radiation is parallel to the reference axis, the cells are equally illuminated and produce equal electrical outputs if they are properly matched.

The outputs of the cells may be fed to a bridge circuit for comparison, and when the cells are equally illuminated, the bridge output is zero. When the sensor is not aimed at the sun and incident radiation is at an angle to the reference axis, one cell receives more illumination than the others, and the bridge produces an output signal which can be utilized to reorient the sensor.

It is also conventional to provide an opaque shield which is generally positioned at or above the apex of the inclined photocell mounts. The shadow cast by the opaque shield on the lesser illuminated cells further reduces their output thereby effecting a significant gain in precision, especially when incident radiation is at a relatively small angle to the reference axis. This, of course, is the situation when the sensor is only slightly misdirected from a position aiming at the sun.

Some problems do arise with such tracking systems, however. Perhaps their greatest fault is their susceptibility to environmental conditions which cause them to react to spurious light sources. These sources may include clouds from which the sun may be reflected and ground albedo. It is possible, of course, to exclude most spurious sources by narrowing the field of view of the sensor but in addition to the equipment complications that such elements introduce, they are ineffective against spurious sources which are not necessarily fixed in position.

Another factor which tends to detract from the performance of systems of the prior art is the unequal aging of the photocells, whose outputs must remain matched if accurate error signals are to be produced. Cell aging and, for that matter, moving spurious sources, can be compensated for by means of frequently repeated calibration operations, but the equipment for such calibration is complex and expensive. Still another problem arises with compensated tracking systems, and that is excessive power consumption. This last problem is, of course, exacerbated when that power must be generated locally, the size and mass of the system necessarily being increased.

Accordingly, the major object of the present invention is to improve solar tracking systems by utilizing calculated tracking rates modified by sensors which differentiate between direct and diffuse light.

A further object of the present invention is to simplify solar tracking by avoiding the requirements of maintaining matched photocells in the sensing system.

A still further object of the present invention is to reduce power consumption in solar tracking systems by operating the tracking system at a relatively constant rate.

SUMMARY OF THE INVENTION

In the present invention, tracking is normally accomplished by a mechanism into which precisely calculated tracking rates are fed. Thus, even when light from the sun is below a chosen threshold value, tracking continues in accordance with a priori knowledge. However, tracking rates are modified when necessary by a sensor which may be of known design employing photocells mounted at equal angles to a reference axis as well as an opaque shield at the apex of the cell mounts.

When tracking is accurate within a predetermined error band and light from the sun is above the threshold value, both photocells are substantially equally illuminated and the sensor is inoperative. If tracking falls outside the error band and light from the sun is above the threshold value, one sensing element is then exposed to both direct and diffuse light while the other element receives only diffuse light. The sensor is then operative to cause the precalculated tracking rate to be either increased or decreased in accordance with the direction of the departure from the proper tracking rate.

So long as the illumination is below the threshold value, the precalculated rate of tracking is maintained. Thus, the sensing system serves to modify the calculated tracking rate only when direct sunlight is available and a tracking error is present. For a better understanding of the present invention together with other objects, features, and advantages, reference should be made to the following description of the preferred embodiment which should be read with reference to the appended drawings in which:

DESCRIPTION OF THE PREFERRED EMBODIMENT

Figure 1:
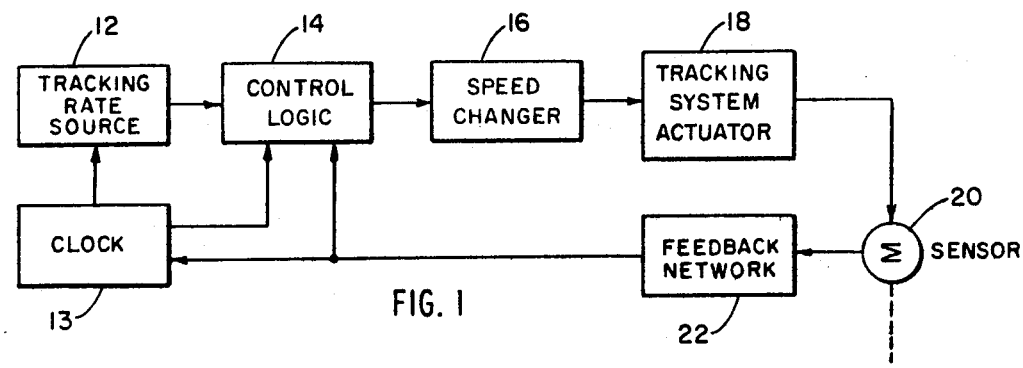
FIG. 1 is a block diagram of a preferred solar tracking system.

For purposes of simplicity, the system shown and described includes an equatorial mount and a single axis of tracking. Such a system requires a minimum of a priori knowledge since the tracking rate is constant throughout the year. A system with two axes or with other mounting systems could equally well be used, however. In the diagram of FIG. 1, there is shown at block 12 a source of precisely calculated tracking information. Parenthetically, it should be noted that it is possible to calculate tracking rates and apply them to a system with a degree of precision which theoretically is adequate for solar tracking. However, various factors preclude the sole use of such precalculated tracking rates. These factors include fabrication tolerances, the possibility of power outages and the degree of orientation accuracy which can be achieved.

Hence, in the present system, a sensing function is added to modify under certain conditions the normal tracking rate. The output of the information source is fed to the Control Logic block 14 of the sensing system. A clock 13 provides output to the source of tracking information 12 and to the Control Logic 14 for purposes explained in detail below. The output of the Control Logic is fed to a speed changer 16 which in turn controls a tracking system actuator 18. The tracking system actuator physically orients the sensor 20. Feedback representing the position of the sensor 20, the direction of its movement and the intensity of the incident light is generated by the feedback network 22. The output of the feedback network is supplied to the clock 13 and the Control Logic 14.

Figure 2:
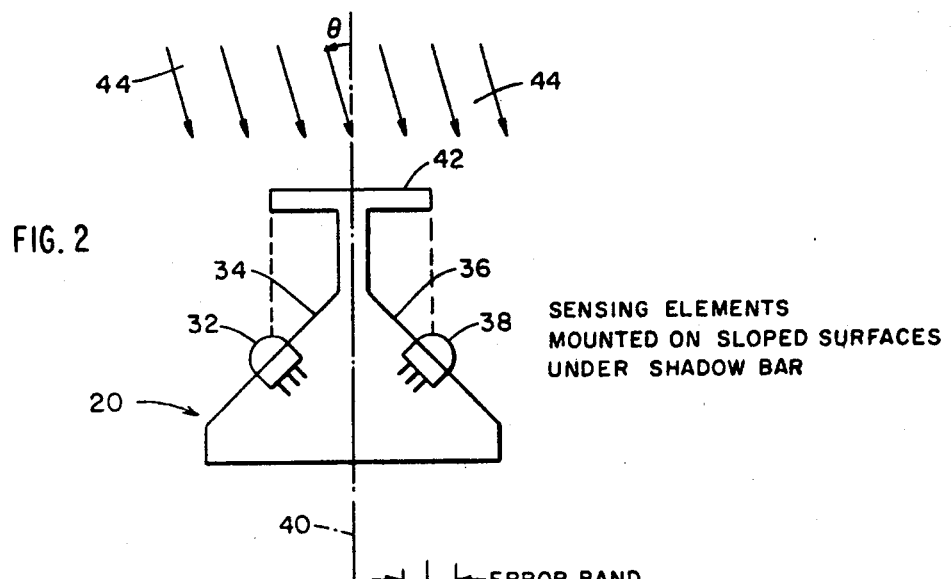
FIG. 2 is a schematic illustration of a suitable sensing element.

FIG. 2 illustrates the relationship between elements of the sensor 20 and the opaque shield which is combined with them. A sensing element such as a photocell 32 is mounted on an inclined surface 34. On a similarly oppositely inclined surface 36, a second photocell 38 is mounted. The slope of the inclined surfaces 34 and 36 is preferably 45 degrees relative to a reference axis 40. Above the apex of the sloped surfaces a relatively wide shadow bar 42 is supported. The shadow bar is oriented at right angles to the reference axis 40 and its width is about the same as the horizontal distance between the centers of the photocells 32 and 38. Incident solar radiation is shown to be at an angle to the reference axis 40 by the lines 44.

Figure 3:
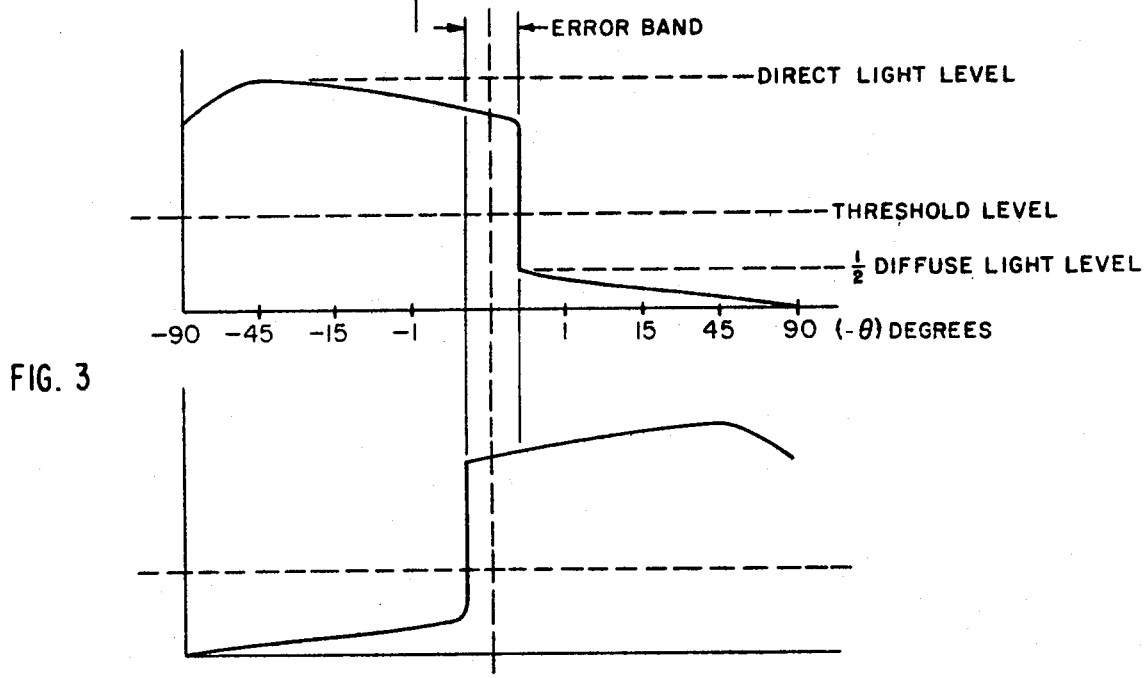
FIG. 3 is a graphic representation of a sensor response relative to angle of illumination.

FIG. 3 is a graphical representation of the output of the photocell system as a function of the angle between the reference axis 40 and the incident solar radiation such as the radiation shown by the lines 44 illustrated in FIG. 2. On the ordinate of the graph, the magnitude of the output is plotted against an expanded scale of the angle of misdirection on the abscissa. The upper graph illustrates output of the photocell 32 and the lower graph illustrates output of the photocell 38.

Assuming radiation to be incident upon the structure of FIG. 2 at an angle of −90°, the photocell 32 is illuminated directly at a high value and the photocell 38 is illuminated at a value approaching zero. As the angle of misdirection is reduced, peak direct illumination of the photocell 32 occurs at an angle of −45°. At this point, the photocell 38 is indirectly illuminated to a relatively minor extent. As the angle of misdirection is further reduced, direct illumination of the photocell 32 gradually decreases while indirect illumination of the photocell 38 gradually increases. As the angle if misdirection approaches zero, the photocell 32 is still subject to direct illumination and, depending upon the projected length of the shadow bar 42 and upon the horizontal distance between the photocells 32 and 38, the photocell 38 begins to receive direct illumination. As the angle of misdirection increases in an opposite direction, the cell 32 loses all direct illumination while the cell 38 receives increasing amounts of direct illumination.

The direct light level is shown in each case at a relatively high point. Similarly, one-half of the diffused light level is shown at a relatively low point. Between those two points, a threshold level may arbitrarily be established in the manner shown and explained hereinbelow.

Also, because of the geometry of the structure shown in FIG. 2, an error band is created about the point of direct aiming of the tracking sensor at the sun. In this instance, the error band is about one-tenth of one degree in total width. Only when the angle if misdirection of the tracking sensor lies outside the error band and the illumination of one or the other of the photocells is above the threshold level do the sensors come into play to modify the normal tracking rate of the sensor which is based upon the output of the source of precalculated information 12.

Figure 4:
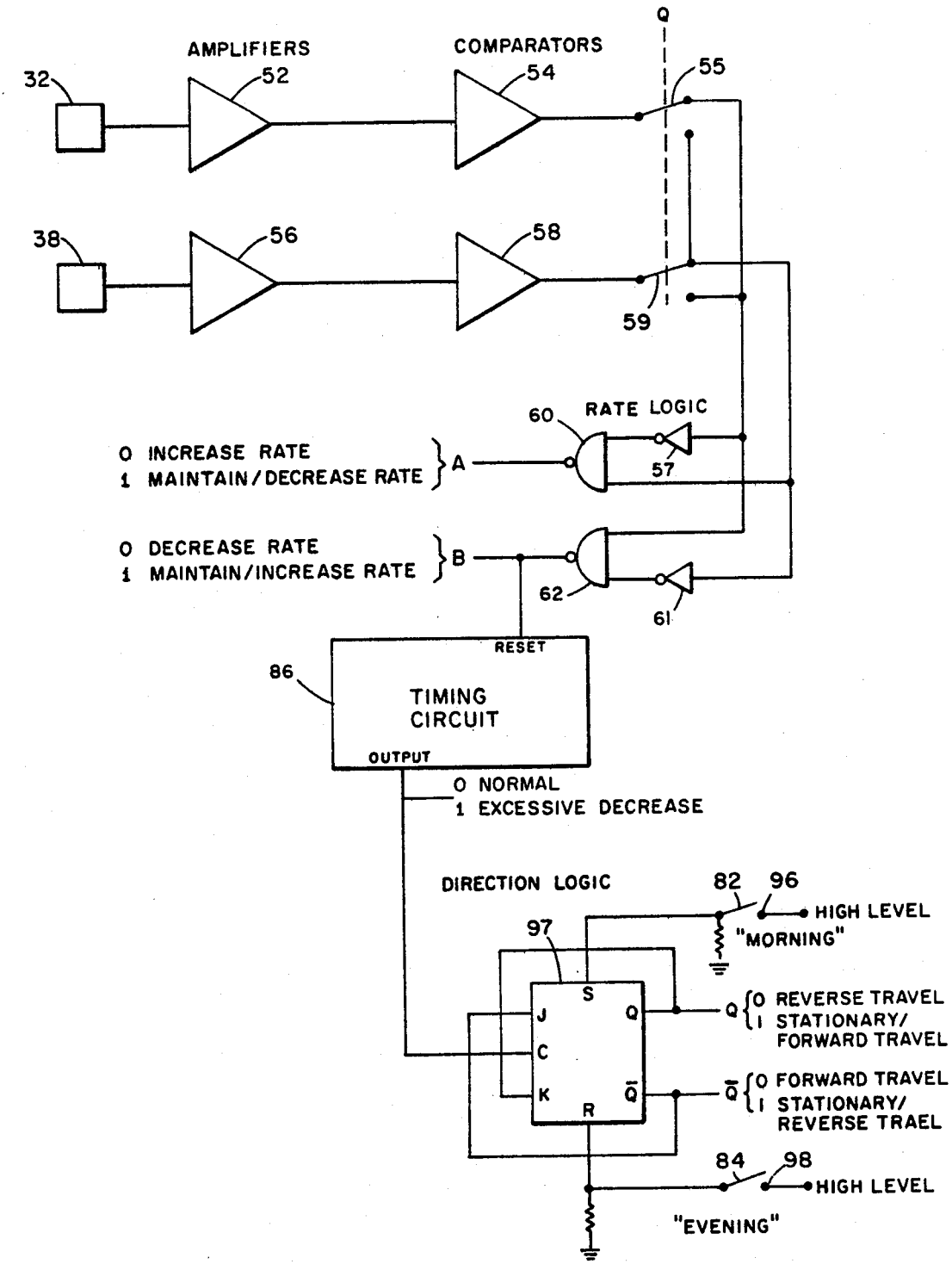
FIG. 4 is a schematic showing of the control logic.

In FIG. 4, the logic by which the dual mode tracking is accomplished is illustrated. The photocell 32 is connected to an amplifier 52, the output of which is fed to a threshold comparator 54. Similarly, the output of the photocell 38 is fed to an amplifier 56 and thence to a threshold comparator 58.

The output of the comparator 54 is fed to an inverter 57 through one section 55 of a reversing double pole-double throw switch controlled by the output Q of a J-K flip flop 97 shown in the lower portion of FIG. 4. The output of the inverter 57 serves as one input of an element 60 such as a NAND gate. It is simultaneously fed directly to one input of another logic element 62 which may also be a NAND gate. The output of the comparator 58 is fed through the other section 59 of the double pole-double throw switch and an inverter 61 to the other input of the element 62 and directly to the other input of the element 60.

When the output of the element 60, denoted the A output, is 0 and the output of the element 62, denoted as the B output, is simultaneously 1, an increased rate of tracking is commanded. Conversely, when the A output is 1 and the B output is 0, a decrease rate of tracking is commanded. When the A output and the B output are both 1 or both 0, the a priori tracking rate is maintained.

The operation is further shown in the following table of Tracking Rate Logic:

TABLE 1

| Tracking Rate Logic | | |
|---|---|---|
| Response of Element 32 | Response of Element 38 | Command Response |
| Above threshold | Above threshold | Maintain rate |
| Below threshold | Above threshold | Increase rate |
| Above threshold | Below threshold | Decrease rate |
| Below threshold | Below threshold | Maintain rate |

Obviously, if both photocells are illuminated above the threshold level, the system is trained upon the sun within the error band and the rate of tracking from the source of precalculated information should be maintained. Alternatively, if one of the photocells is illuminated below the threshold level and the other is illuminated above the threshold level, the system is misdirected to a degree greater than that of the error band and the rate of tracking should be increased or decreased to return the system to a position trained upon the sun. If neither photocell is illuminated above the threshold level, the system may or may not be aimed toward the sun, but tracking is maintained in accordance with the a priori rate.

With such logic, the sensing system operates to modify the tracking rate only when (1) direct sunlight is available, and (2) a tracking error exists. Variations in the absolute illumination level such as might be caused by dust, moisture, or air mass do not affect the tracking operation until the illumination level exceeds the threshold value. Also, the system is unaffected by unequal element responses due to aging or other variations. Nor do reflections from clouds or unequal albedo cause the system to be misdirected. This advantage is obtained because when the sun is being tracked within the error band and the illumination level is high, both elements provide an output well above the threshold and the relative amount by which error exceeds the threshold value is of no significance.

In addition to the digital signals for controlling rate, additional logic is necessary to return the tracking system to its "morning" position at the end of a day and to reverse the direction of travel if the tracking system is grossly in error. The necessary additional logic to perform these functions is shown in the lower portion of FIG. 4.

Commencement of a day's tracking by the sensor is initiated by closing of a normally open "MORNING" switch 82. This switch may be closed physically by the return of the sensor from the previous day's excursion or it may be closed in response to output of the clock 13. A similar switch 84, denoted the "EVENING" switch, is provided to cause return travel of the sensor. It too may be physically closed by the sensor reaching it at the end of the day or it may be clock controlled. In either case, the return travel of the sensor is preferred to be at a slow rate throughout the night to minimize power usage. The "EVENING" switch 84 can also be used, if desired, to resynchronize the internal system clock.

At the commencement of a day's tracking, the switch 82 closes briefly and a 1 input derived from a high level source 96 is applied to the set input S of a J-K flip flop 97. At the same time, under normal conditions a 0 input from a timing circuit 86 is applied to the clock input C of the flip flop 97. With the switch 84 in an open position so that a 0 input is applied to the reset input R of the flip flop 97, the flip flop 97 provides a Q output of 1 and a $\overline{Q}$ output of 0, producing forward travel of the sensor 20.

When the sensor 20 reaches the end of its day's excursion, the "EVENING" switch 84 is closed briefly while the "MORNING" switch 82 remains open. The flip flop 97 then provides a Q output of 0 and a $\overline{Q}$ output of 1, producing reverse travel of the sensor. The change in Q output also cuases switch sections 55 and 59 to change position, which reverses the inputs to the elements 60 and 62 from the photocells 32 and 38.

Figure 5:
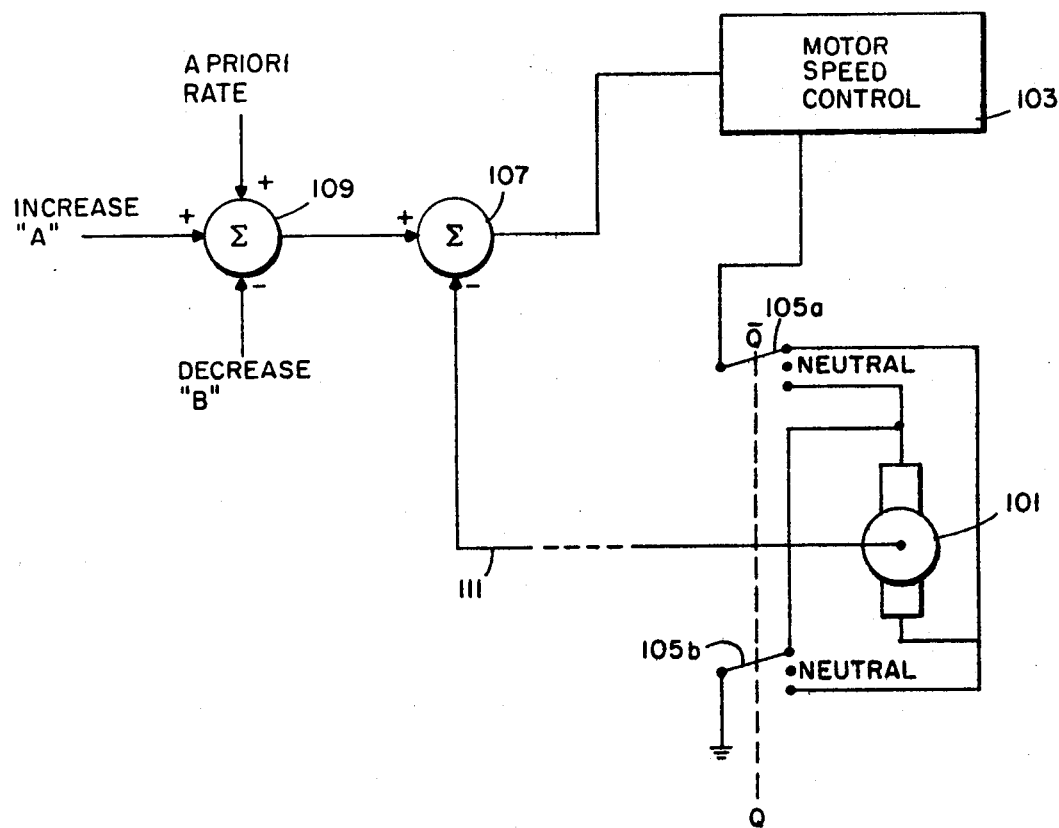
FIG. 5 is a schematic showing of a sensor drive system.

The flip flop 97 can also be directed to hold the sensor 20 stationary if desired. This is accomplished by closing both switches 82 and 84, which provides Q and $\overline{Q}$ outputs of 1. The Q and $\overline{Q}$ outputs produce a neutral position of a switch controlling a sensor drive motor, as illustrated in FIG. 5 and the description thereof provided hereinafter.

The travel direction operation of the sensor 20 is summarized in the following table of Travel Direction Logic:

TABLE 2

| | Travel Direction Logic | |
|---|---|---|
| Q Output | $\overline{Q}$ Output | Sensor Travel Direction |
| 1 | 1 | Stationary |
| 1 | 0 | Forward |
| 0 | 1 | Reverse |
| 0 | 0 | Invalid |

In addition to the normal daily commands, other situations can arise in which it is necessary to reverse the direction of travel of the sensor. By way of example, the system may become severely misaligned in the event of a power outage or other breakdown. It is also possible that the direction of travel might require reversal if under the command of the "EVENING" switch 84 the system was in the process of returning to the morning position and was passed by the sun. In this latter instance, before the sensor reached and closed the "MORNING" switch, a decreased rate of travel would be commanded with the result that the achievement of alignment would be delayed or unrealized. To avoid such an occurrence, the timing circuit 86 is provided and if a decreased rate of travel is commanded for a period longer than a period predetermined by the timing circuit, the direction of travel of the sensor is reversed.

Under normal conditions, i.e. so long as a decreased rate of travel is not commanded for an excessive period of time, the timing circuit provides a 0 output. This 0 output typically may continue during several changes in the B output of NAND gate 62 since each change to a B output of 1 provides a reset input to the timing circit 86. However, in the event that a decreased rate (0 output from B) is commanded for a period of time which exceeds a predetermined time, indicating that alignment is not being achieved, the timing circuit changes its state from its normal 0 output to a 1 output which is applied to the clock input C of the J-K flip flop 97. This effects a reversal of the output Q, $\overline{Q}$ to reverse the direction of travel of the sensor.

As noted above, the timing circuit serves to reverse the direction of travel of the sensor only when the tracking system commands a decreased rate of travel for some predetermined excessive period of time. As the system comes into alignment, it will operate once again normally in the selected direction under the control of the sensing system.

Although there are a number of sensor drives which might be incorporated in the tracking system of the present invention, FIG. 5 illustrates a drive which would be practical. It includes a D.C. motor 101 operable at a speed determined by a motor speed controller 103 through a double pole three position switch 105 for controlling direction of motor rotation. The position of the switch is determined by the Q and $\overline{Q}$ outputs.

Input to the motor speed controller 103 may be provided by a summing network 107, the input to which comprises the output of a summing network 109 and, optionally, a feedback signal representing the speed of the D.C. motor 101 on the line 111. Input to the summing network 109 comprises the "A" output of the NAND gate 60, the "B" output of the NAND gate 62, and the a priori tracking rate from the source 12.

The line 111 which completes the feedback servo loop is not necessary, since speed can be sensed indirectly, allowing the system to operate as an open loop. Moreover, various other drive systems whether of the closed or open loop type are feasible. For example, an induction motor might be used with pulses controlled by the A and B outputs being delivered to the appropriate windings of the motor to control its speed. A constant volt/Hertz output can be delivered if the duty cycle of the output varies with the pulse repetition rate determined by the A and B signals. Still other more sophisticated AC motor drive systems can be employed to minimize harmonic distortion of the power delivered to the motor.

What is claimed is:

1. A solar tracking system comprising a source of precalculated information regarding the path of the sun on any given day, a sensor of radiation from the sun, means for normally maintaining said sensor trained upon the sun in accordance with signals derived from said source of precalculated information, and means providing an output from said sensor for modifying said signals to reorient said sensor only upon detection by said sensor of radiation above a predetermined threshold level and failure of said sensor to remain trained upon the sun within a predetermined degree of error.

2. A solar tracking system as defined in claim 1 wherein said sensor comprises means including a plurality of solar radiation detecting elements arranged for differentiating between direct radiation above said threshold level and diffused radiation below said threshold level and providing said output for modifying said signals to reorient said sensor toward the source of said direct radiation.

3. A solar tracking system as defined in claim 1 wherein said sensor comprises a plurality of light detecting elements equiangularly disposed relative to a reference axis, said reference axis normally coinciding with the direction of incident radiation from the sun, an opaque shield being disposed symmetrically about said reference axis adjacent said light detecting elements and normally shielding each of said light detecting elements equally from said incident radiation, said means providing an output from said sensor including a circuit for detecting output of any of said light detecting elements in excess of said threshold level, said detected output modifying said signals to reorient said sensor in a direction coincident sith said reference axis.

4. In a solar tracking system as defined in claim 1, the combination wherein said means for normally maintaining said sensor trained upon the sun comprises a mounting for said sensor and means for moving said sensor about one or more axes of said mounting at a rate normally in accordance with signals from said source of precalculated information and wherein said sensor comprises a pair of light detecting elements equiangularly disposed relative to a reference axis which normally coincides with the direction of incident solar radiation and a logic circuit connected to said light detecting elements, said logic circuit providing said output modifying said signals to increase or decrease said rate only upon detection of radiation above said threshold level by one of said light detecting elements.

5. In a solar tracking system as defined in claim 4, the further combination therewith of a first limit switch connected to said logic circuit and to said means for moving said sensor about said one or more axes, said first limit switch being engageable by said sensor approximately at sunset to reverse the direction of tracking by said sensor and return it to a position to resume tracking approximately at sunrise.

6. In a solar tracking system as defined in claim 4, the further combination therewith of a timing circuit connected to said logic circuit and to said means for moving said sensor about said one or more axes, and means for comparing the duration of the output of said timing circuit with the output of said logic circuit to provide a signal to reverse the direction of tracking of said sensor upon the output of said logic circuit tending to decrease said rate of tracking exceeding the duration of said timing circuit.

7. A solar tracking system as defined in claim 4 wherein said mounting is an equatorial mounting.

8. A method for tracking the path of the sun with a sensor of solar radiation which comprises the steps of normally moving said sensor about a first axis at a rate to maintain it directed along a reference axis perpendicularly to said first axis at the position of said sun as predicted by a priori information, detecting the existence of radiation from said sun, and modifying the normal rate of moving of said sensor during periods when the radiation from said sun exceeds a predetermined threshold value and the actual position of said sun departs from said position predicted by said a priori information by a predetermined error value.

9. A method of tracking the path of the sun as defined in claim 8 wherein said step of detecting the existence of radiation from said sun further includes the steps of differentiating between direct and diffuse radiation from said sun and modifying said normal rate of moving said sensor only upon detection of direct radiation from said sun.

10. A method for tracking the path of the sun as defined in claim 9 wherein said step of differentiating between direct and diffuse radiation from said sun includes the steps of comparing the intensity of said radiation at one side of said reference axis to said radiation at the other side of said reference axis as said sensor is moved along said path of the sun and modifying said normal rate of moving said sensor only when the intensity of radiation at one side or the other side of said reference axis exceeds said predetermined threshold value.

* * * * *